United States Patent [19]

Watanabe

[11] Patent Number: 4,815,286
[45] Date of Patent: Mar. 28, 1989

[54] AIR FLOW CHECK VALVE AND SYSTEM INCORPORATING THE SAME

[75] Inventor: Kuniya Watanabe, Miyagi, Japan

[73] Assignee: Tohoku Electric Power Company, Incorporated, Japan

[21] Appl. No.: 117,416

[22] Filed: Nov. 2, 1987

Related U.S. Application Data

[63] Continuation of Ser. No. 890,959, filed as PCT JP85/00581 on Oct. 17, 1985, published as WO86/03261 on Jun. 5, 1986, abandoned.

[30] Foreign Application Priority Data

Nov. 26, 1984 [JP] Japan .................. 59-249344

[51] Int. Cl.$^4$ ............................................. F15B 11/06
[52] U.S. Cl. ...................................... 60/398; 137/251.1
[58] Field of Search ...................... 137/247.27, 247.35, 137/251.1, 252, 253, 254; 60/398; 417/100

[56] References Cited

U.S. PATENT DOCUMENTS

| | | | |
|---|---|---|---|
| 1,045,715 | 11/1912 | Lightfoot | 137/252 X |
| 1,144,306 | 6/1915 | Mock | 138/37 X |
| 2,247,566 | 7/1941 | Walton | 137/254 |
| 2,929,335 | 3/1960 | Seiler | 137/251.1 X |
| 3,228,702 | 1/1966 | Ulm | 137/251.1 X |
| 3,925,986 | 12/1975 | Barwick | 60/398 |
| 4,067,351 | 1/1978 | Causey | 137/254 |
| 4,375,151 | 3/1983 | French | 60/398 |
| 4,466,244 | 8/1984 | Wu | 60/497 X |
| 4,655,242 | 4/1987 | Hamazaki | 137/251.1 X |

FOREIGN PATENT DOCUMENTS

| | | | |
|---|---|---|---|
| 1582618 | 10/1969 | France | 137/251 |
| 25-2453 | 8/1950 | Japan | 60/398 |
| 45-12837 | 5/1970 | Japan | |
| 48-2127 | 1/1973 | Japan | |
| 48-20686 | 3/1973 | Japan | |
| 1312512 | 4/1973 | United Kingdom | |
| 2041174 | 9/1980 | United Kingdom | 137/251 |

Primary Examiner—Gerald A. Michalsky
Attorney, Agent, or Firm—Robbins & Laramie

[57] ABSTRACT

The present invention relates to an air flow check valve and a system incorporating a plurality thereof, having a function for rectifying the flow of air produced by compression and expansion of air in a closed air vessel which in turn is caused by the force of waves of the sea, as well as a function for regulating the pressure of rectified air flow, the air flow check valve having an air chamber, a liquid stored in the air chamber, a pipe extending into the air chamber and immersed in the liquid a predetermined depth, an inlet connected to the pipe and an outlet opening into the air chamber, wherein, when the air pressure at inlet becomes higher than the pressure at outlet by an amount corresponding to the depth of immersion of the pipe in the liquid, the air is discharged through the outlet and when the air pressure at the outlet higher than that at the inlet, the air forces the liquid in the air chamber into the pipe until the level of the liquid in the pipe rises at the immersion depth, so that the air flow-back from the outlet to the inlet is checked until the level of liquid in the air chamber falls down to the lower end portion of the inlet pipe, because the cross-sectional area of the pipe is much smaller than that of the air chamber, and therefore being applied for a system for checking air flow and incorporated with an energy converting plant for converting wave energy into electric energy.

9 Claims, 4 Drawing Sheets

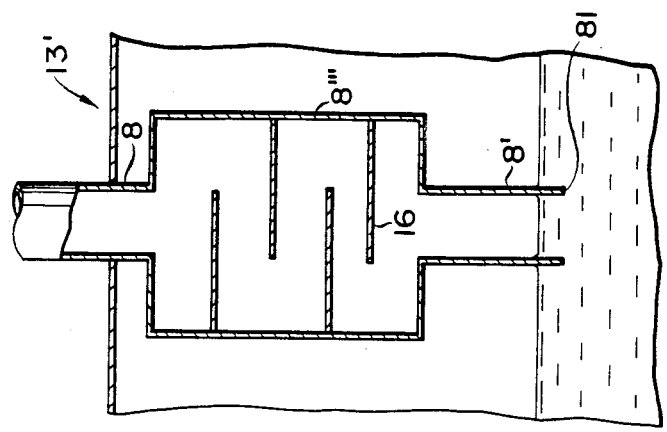
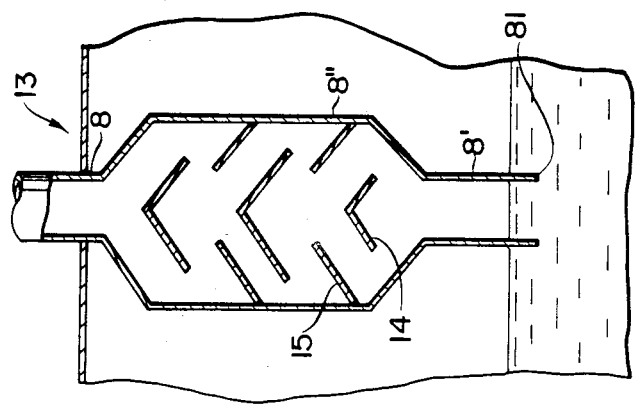

AIR FLOW CHECK VALVE AND SYSTEM INCORPORATING THE SAME

No. 890,959, filed as PCT JP85/00581 on Oct. 17, 1985, published as WD86/03261 on Jun. 5, 1986, now abandoned.

FIELD OF THE INVENTION

The present invention relates to an air flow check valve having a function for rectifying the flow of air produced by compression and expansion of air in a closed air vessel which in turn is caused by the force of wave of sea, as well as a function for regulating the pressure of the rectified air flow. The invention is also concerned with a system incorporating a plurality of such check valves.

A known apparatus for generating electric power from the energy of sea wave has an air vessel into which the sea wave is introduced to cause suction and discharge of air. Namely, when the level of the waving sea water is lowered, the pressure in the air vessel is decreased so that ambient air is sucked into the air vessel and, when the water level is increased, the air in the air vessel is compressed and discharged and introduced to an air turbine thereby which in turn drives a generator to produce electric power. The air is then exhausted to the atmosphere.

In this known apparatus, therefore, the air vessel is required to have both a check valve which allows the ambient air to be sucked into the air vessel and a check valve which allows the air to be exhausted after driving the air turbine. These check valves are preferably lightweight, in order to allow the air to open and close the valve and to attain a high suction and exhaust efficiencies. For these reasons, the check valves incorporated in this type of apparatus are usually flap valves made of a plastic.

The flap valve is constituted mainly by a flap plate and a valve seat. Breakage of the valve plate and corrosion of the valve seat are inevitable during long use of the apparatus.

Thus, in the conventional apparatus of the kind described, the check valves could not stand long use with high reliability.

DISCLOSURE OF THE INVENTION

Accordingly, an object of the invention is to provide a check valve which is free from the above-described problems of the prior art and which is capable of unidirectionally rectifying the flow of air while maintaining a constant air pressure in the air vessel against the change of air volume due to wave.

Another object of the invention is to provide a check valve which makes it possible to construct a closed-type energy converting plant for converting wave energy into electric energy, which plant, unlike the conventional open-type plant, can operate with a high reliability.

Still another object of the invention is to provide a check valve of a simple construction which does not incorporate any movable mechanical element.

A further object of the invention is to provide a check valve which suffers from only small wear and, hence, can stand a long use.

To these ends, according to one aspect of the invention, there is provided a check valve comprising an air chamber, a liquid stored in the air chamber, a pipe extended into the air chamber and immersed in the liquid a predetermined depth, an inlet connected to the pipe, and an outlet opening into the air chamber.

According to this arrangement, when the air pressure at the inlet becomes higher than the pressure at the outlet by an amount corresponding to the depth of immersion of the pipe in the liquid, the air comes into the air chamber through the inlet and is discharged through the outlet. When the air pressure at the outlet becomes high, the air forces the liquid into the pipe so that the level of the liquid in the pipes rises beyond the immersion depth, because the cross-sectional area of the pipe is much smaller than that of the air chamber. The level of the liquid in the pipe corresponds to the ratio of cross-sectional area between the pipe and the air chamber and, therefore, is considerably high but the air does not flow back through the inlet from the air chamber: namely, the checking function is performed. Thus, the check valve in accordance with the invention does not have any mechanical movable part and, therefore, can stand a long use well performing the checking or rectifying function, without risk of trouble.

According to another aspect of the invention, there is provided a system in which a plurality of check valves of the type mentioned above are connected at their outlet sides to a common pipe.

This arrangement fulfills the aforementioned objects of the invention. Preferably, the check valves are connected at their inlet sides to the inlet and outlet sides of different air vessels which are under action of the wave at different phases. With such an arrangement, it is possible to supply compressed air successively from different air vessels at different phases into the common pipe, so that a substantially constant air pressure is maintained in the common pipe. In consequence, the air turbine is supplied with air of a substantially constant pressure, thus steadily generating electric power.

According to still another aspect of the invention, there is provided a system in which the inlets of a plurality of check valves of the type mentioned above are branched from a common pipe, particularly from the exhaust pipe from the air turbine.

This arrangement fulfills the aforesaid objects of the invention. Preferably, the outlets of these check valves are connected to the inlet and outlet sides of different air vessels which are under action of wave at different phases, so that air is successively sucked through the common pipe such as to maintain a substantially constant pressure in the common pipe, i.e., a substantially constant exhaust air pressure of the air turbine. This permits a steady operation of the air turbine and, hence, a steady generation of electric power.

BRIEF DESCRIPTION OF THE DRAWINGS

FIG. 6 is a vertical sectional view of an example of a buffer device for buffering any abrupt rise of the checking liquid flowing back into the inlet pipe during checking; and FIG. 7 is a vertical sectional view of another example of the buffering device.

THE BEST MODE FOR CARRYING OUT THE INVENTION

Figure 1:
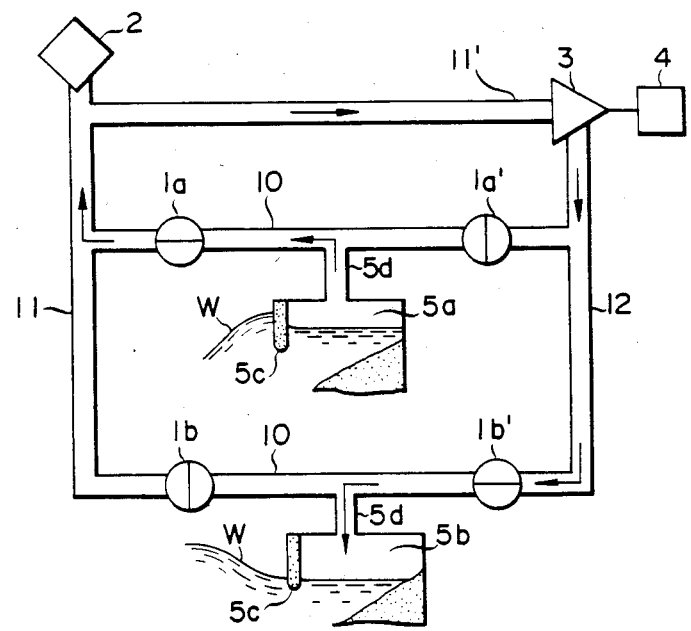
FIG. 1 is an illustration of an air-recirculating type wave-force power generating plant making use of air flow check valves in accordance with the invention.

FIG. 1 shows an air-recirculating type wave-force power generating plant incorporating check valves of the invention and adapted to be situated on seashore.

The power generating plant has a plurality of air vessels 5a, 5b accommodating air. Each air vessel has an opening 5c communicating with sea water and a pipe 5d serving as air inlet/outlet pipe. The pipe 5d is branched into two branch pipes 10, 10. The branch pipes 10, 10, 10, 10 are provided with check valves 1a, 1a', 1b, 1b' in accordance with the invention. The check valves 1a, 1b on the air outlet side are connected to a common pipe 11 which in turn is connected to a pressure regulating air reservoir 2. An air turbine 3 is connected to the outlet 11' of this common pipe 11. A common exhaust pipe 12 connected to the downstream side of the air turbine 3 is connected to the branch pipes 10, 10 which are connected to the inlet sides of the check valves 1a', 1b' on the sunction side of the air vessels.

The operation of the wave-force electric power generating plant having the check valves of the invention operates in a manner which will be explained hereinunder.

The air in the air vessel 5a is compressed as the level of sea water in this vessel is raised by the waving of the sea water. In consequence, the check valve 1a' on the suction side is closed, while the check valve 1a on the discharge side is opened, thereby discharging the compressed air into the common pipe 11. The compressed air is then supplied through the outlet 11' of the common pipe 11 to the air turbine 3 such as to drive the air turbine 3 which in turn drives a generator 4 thereby producing electric power. The air after driving expansion through the air turbine 3 flows into the exhaust common pipe 12. At this moment, the water level is coming down in the other air vessel 5b, so that the check valve 1b on the discharge side of this air vessel 5b is closed while the check valve 1b' on the suction side is opened, whereby the air discharged from the air turbine 3 into the common exhaust pipe 12 is sucked through the check valve 1b'.

Thus, in the air-recirculating type wave-force power generating plant incorporating the check valves of the invention, air is compressed and discharged from one of the air vessels such as to drive the air turbine, while the other air vessel sucks the air expanded through the air turbine. It is, therefore, possible to obtain a substantially steady flow of air introduced to the air turbine.

The construction of each of the check valves 1a, 1a', 1b, 1b' will be described in detail hereinunder.

Figure 2:
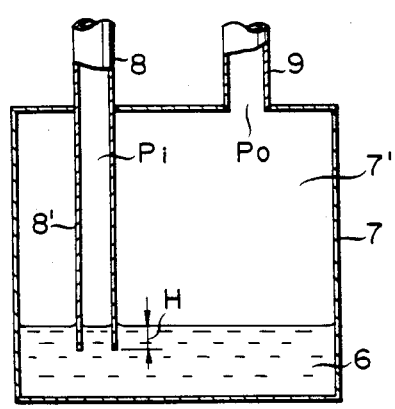
FIG. 2 is a vertical sectional view of an embodiment of the check valve in accordance with the invention.

Each of the check valves 1a, 1a', 1b, 1b' shown in FIG. 2 has an air chamber 7 the lower portion of which is filled with liquid, particularly water. An inlet 8 and an outlet 9 are formed in the top wall of the air chamber 7. An inlet pipe 8' projects through the inlet 8 into the air vessel 7 such as to be immersed in the water to a depth H. The ratio of cross-sectional area between the inlet pipe 8' and the air chamber 7 is selected to fall within the range of between 1:3 and 1:10.

In FIG. 2, the check valve is shown in a state in which the pressure Pi at the inlet and the pressure Po at the outlet are equal, i.e., the condition of Pi=Po is met.

The function of the check valve will be described hereinunder with reference to FIGS. 3 to 5.

Figure 3:
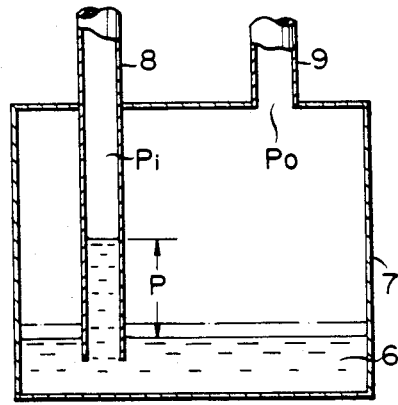
FIG. 3 is a vertical sectional view illustrating the basic checking function of the embodiment shown in FIG. 2.

Referring first to FIG. 3, the pressure Pi at the inlet of the check valve is lower than the pressure Po at the outlet of the same, so that a pressure difference P which is given as P=Po−Pi exists, thereby preventing backward flow of air from the outlet 9 to the inlet 8.

It will be understood that the pressure difference P between the inlet pressure Pi and the outlet pressure Po corresponds to the head of the water in the inlet pipe 8' into which the water is forced by the pressure acting on the water surface in the air chamber 7. Therefore, considering that the density of water is 1 ($\rho=1$), the ratio of cross-sectional area between the air chamber and the inlet pipe 8' should be made greater, for obtaining a greater value of the pressure difference P.

Figure 4:
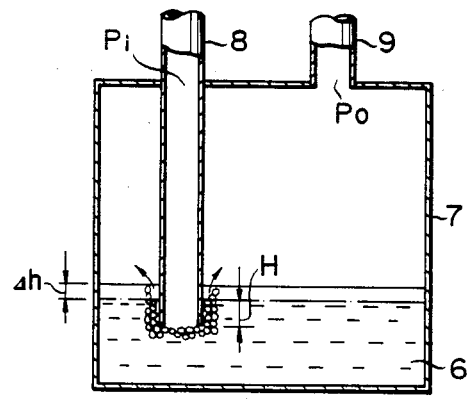
FIG. 4 is a vertical sectional view illustrating the basic air passing function of the embodiment shown in FIG. 2.

Referring now to FIG. 4, the pressure Pi at the inlet of the check valve is greater than the pressure Po at the outlet of the same. When the pressure difference Pi−Po has become greater than a predetermined pressure H+Δh, i.e., when the condition of Pi−Po>H+Δh is met, air is sucked through the inlet 8 and discharged through the outlet 9. The symbol H represents the depth of the lower end of the inlet pipe 8' from the water level as measured when the check valves are not functioning, and Δh represents the increment of the water level in the air chamber 7 as a result of displacement of the water from the inlet pipe 8' by the air pressure.

When the condition of Pi−Po>H+Δh is established, the air starts to flow from the inlet pipe 8' into the air chamber 7. It proved that the influence of the water head H+Δh, however, is weakened by the inertia of flow of air, and does not produce any substantial resistance to the flow of air.

In other words, it proved that, once the flow of air from the inlet pipe 8' into the air space 7' in the air chamber takes place, the pressure of water 6 in the air chamber 7 does not substantially resist to the flow of air.

Figure 5:
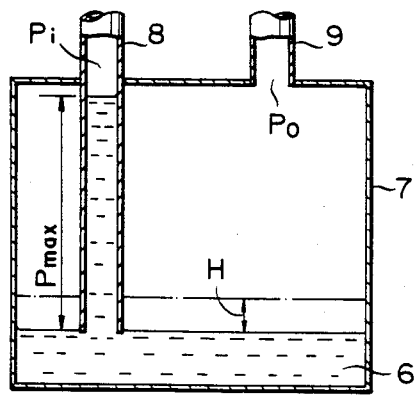
FIG. 5 is a vertical sectional view illustrating the maximum checking effect produced by the embodiment shown in FIG. 2.

FIG. 5 shows the check valve in a state in which the outlet pressure Po has been increased to maximize the pressure difference between the outlet and inlet pressures, so that the backward flow of air is checked by the maximum checking force. In this state, the level of water 6 in the air chamber 7 has been lowered to the level of the lower end of the inlet pipe 8'. Thus, the pressure difference is given as Pmax=Po max−Pi max.

When the action of the wave is vigorous, the water 6 in the air chamber 7 rushes into the inlet pipe 8' to produce a large inertia. Such a large inertia may drive the water to a level higher than the level corresponding to the maximum pressure difference Pmax. In addition, the water rushing into the inlet pipe 8' may be accompanied by the air in the air space 7' of the air chamber 7. In such cases, the checking function of the check valve is failed.

In order to eliminate such a problem, it is advisable to provide a buffer device as shown in FIG. 6 or 7 in the inlet pipe 8'.

The buffer device 13 shown in FIG. 6 has a pipe 8" the cross-sectional area of which is greater than that of the inlet pipe 8' immersed in the water 6 within the air chamber 7. The pipe 8", which is connected to the inlet pipe 8' decreases the velocity of the water 6 ascending in the inlet pipe 8'. Preferably, the pipe 8" is provided therein with inversed V-shaped buffer plates 14 and upwardly converging buffer plates 15 which are arranged alternatingly in the heightwise direction, such as to prevent abrupt rushing of water 6 upward into the inlet pipe 8'. The inversed V-shaped buffer plates 14 and upwardly converging buffer plates 15 does not produce any substantial resistance to the air flowing downwardly in the inlet pipe 8' from the inlet 8.

The buffer device 13' shown in FIG. 7 has a pipe 8''' of a cross-sectional area greater than the inlet pipe 8', leading from the inlet 8 as in the case of the buffer device shown in FIG. 6. The pipe 8''' is connected to the inlet pipe 8'. The pipe 8''' of the large cross-sectional area is provided therein with at least two pairs of buffer plates which open alternatingly at the left and right sides as viewed in this Figure. The velocity of water 6 rushing upwardly from th air chamber 7 is decreased as it reaches the pipe 8''' due to the large cross-sectional area of this pipe 8'''. The buffer plates 16 effectively impedes the upward movement of the water, so that the tendency of accompanying of air from the air chamber 7 is suppressed advantageously.

When the inlet pipe 8' is provided with a buffer device which is composed of a pipe having a large cross-sectional area as described, it is necessary that the depth of immersion of the inlet pipe 8' below the water level be increased correspondingly to the increment of the cross-sectional area due to the presence of the buffer pipe, in order to obtain the desired maximum pressure difference Pmax explained before in connection with FIG. 5.

Figure 8:
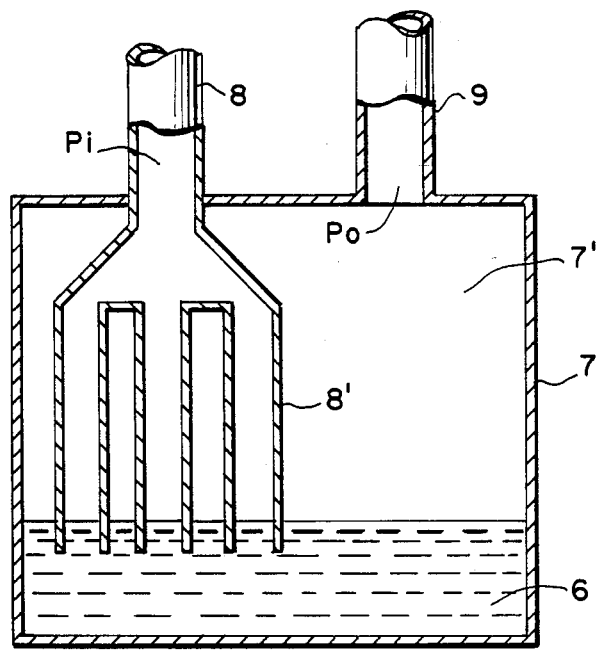
FIG. 8 is a vertical section of a check valve according to another embodiment of the invention having multiple inlet pipes.

In order to prevent quick rise of the water level at the end portion of the inlet pipe, the check valve of the invention may have a plurality of inlet pipes having small-cross-sectional area. According to such an arrangement, as shown for example in FIG. 8, since the Reynolds number of water is greater than that of air, the inlet pipes 8' produce a large resistance against water such as to reduce the velocity of water, thus preventing upward rushing of water. However, these inlet pipes 8' do not produce any substantial resistance against air flowing from the inlet pipes 8' to the outlet 9, so that the function of the check valve of the invention is not substantially impaired.

The invention in its another aspects provides a system in which a plurality of check valves 1a, 1a', 1b, 1b' are connected at their outlet sides to the common pipe 11. In this system, the wave acts on different air vessels 5a and 5b with a certain phase difference, so that the air vessels 5a and 5b discharge compressed air successively and alternatingly through the outlets 9 of the check valves into the common pipe 11, whereby the pressure in the common pipe 11 is maintained substantially constant, thus ensuring a steady driving of the power generating air turbine.

The invention provides in its still another aspect in which the check valves 1a, 1a', 1b, 1b' of the invention are connected at their inlets 8 to a common exhaust pipe from the air turbine. In this system, the wave acts on different air vessels 5a, 5b with certain phase difference, so that they suck successively and alternatingly the air from the air turbine 3. Consequently, the air pressure in the common pipe 12 is maintained substantially constant, thus ensuring a steady driving of the air turbine 3 and, hence, a steady driving of the electric generator 4.

In the described embodiment, a system of the first aspect consisting of a plurality of check valves is connected at the outlets of these check valves to the high-pressure side of the air turbine, while the system according to another aspect of the invention consisting of a plurality of check valves are connected at the inlets of the valves to the exhaust side of the air turbine, so that the effect for steadying the driving of air turbine is enhanced as compared with the case where either one of these systems is used solely. In consequence, the electric power generation is steadied and stabilized, which in turn permits the size of the air turbine-generator assembly as a whole to be reduced.

What is claimed is:

1. A power generating system including an air actuated power generator having an air inlet and air outlet in which the air is driven by the wave force of sea water, means for circulating rectified air respectively into and out of said power generator comprising:

at least one air vessel having an inlet in communication with the sea water for admitting a variable level of sea water therein and an air space above the level of the sea water, the air vessel having an outlet above the level of sea water, the air in the air space being subjected to expansion and compression by the rising and falling of the level of the sea water caused by the wave force thereof to produce an airflow into and out of the air vessel;

a pair of respective first and second check valves coupled to each air vessel for rectifying the airflow produced by the compression and expansion of the air in the air vessel so that said airflow is provided in one direction for said power generating means, each of said first and second check valves comprising a closed air chamber each accommodating a predetermined, substantially the same, level of water having a relatively large cross sectional area at said level and a water vapor saturated internal air space above the water level for maintaining the level of water in the air chamber at a substantially constant volume; each air chamber having an inlet and an outlet in the internal air space; and at least one air inlet pipe, said air inlet pipe being connected to the inlet at its upper end, said air inlet pipe extending into said air chamber such that a lower end portion of said air inlet pipe is immersed at least to a predetermined, substantially the same, depth below the level of said water in the air chamber and having a cross sectional area smaller than the cross sectional area of the chamber at said level of immersion within the air chamber so that air flowing into each check valve moves at a substantially constant pressure only from the respective inlet through the inlet pipe and to the outlet thereof when air pressure in the inlet pipe is greater than an amount determined by the depth of immersion of the air inlet pipe in the water and the relative difference between the cross section of the inlet pipe and the cross section of the chamber at said depth of immersion;

said first check valve having its inlet coupled to the outlet of the air vessel and the second check valve having its outlet coupled to the outlet of the air vessel;

said first check valve being adapted to have its outlet coupled to the inlet of said power generating means and the second check valve being adapted to have its inlet coupled to the outlet of said power generating means so that air flows in a closed loop.

2. A power generating system according to claim 1, wherein the depth of immersion of said air inlet pipe from the water surface and the ratio of cross-sectional area between said air chamber and said air inlet pipe are determined in accordance with the pressure difference between the pressure at said inlet and the pressure at said outlet.

3. A power generating system according to claim 1, wherein the ratio of cross-sectional area between said air chamber and said air inlet pipe is selected to range between 3–10:1.

4. A check valve according to claim 1, wherein said at least one air inlet pipe is provided with a buffer device within the closed air chamber of the check valve.

5. A power generating system according to claim 4, wherein said buffer device has a greater cross-sectional area than said air inlet pipe.

6. A power generating system according to claim 4, wherein said buffer device is provided therein with buffer plates.

7. A power generating system according to claim 6, wherein said buffer plates includes plates which diverge downwardly.

8. A power generating system according to claim 6, wherein said buffer plates include horizontally arranged plates.

9. A power generating system according to claim 1 further comprising a plurality of said air vessels and a common pipe coupled to the outlet of said first check valve for each air vessel said common pipe being adapted to be coupled to the air inlet of said power generating means, and a common pipe coupled to the inlet of said second check valve adapted to be coupled to the outlet of said power generating means.

* * * * *